(No Model.)

C. C. FROELICH, W. LOREY & H. GUENTHER.
FILTER.

No. 498,544. Patented May 30, 1893.

WITNESSES:
O. F. Cagle.
L. Douville.

INVENTORS.
Charles C. Froelich
William Lorey
Henry Guenther
BY John A. Wiedersheim
ATTORNEY.

UNITED STATES PATENT OFFICE.

CHARLES C. FROELICH, OF POTTSTOWN, AND WILLIAM LOREY AND HENRY GUENTHER, OF PHILADELPHIA, PENNSYLVANIA.

FILTER.

SPECIFICATION forming part of Letters Patent No. 498,544, dated May 30, 1893.

Application filed July 11, 1892. Serial No. 439,577. (No model.)

*To all whom it may concern:*

Be it known that we, CHARLES C. FROELICH, residing at Pottstown, county of Montgomery, and WILLIAM LOREY and HENRY GUENTHER, residing in the city and county of Philadelphia, State of Pennsylvania, citizens of the United States, have invented a new and useful Improvement in Filters, which improvement is fully set forth in the following specification and accompanying drawings.

Our invention consists of improvements in filters as will be hereinafter fully set forth and definitely claimed.

Figure 1:
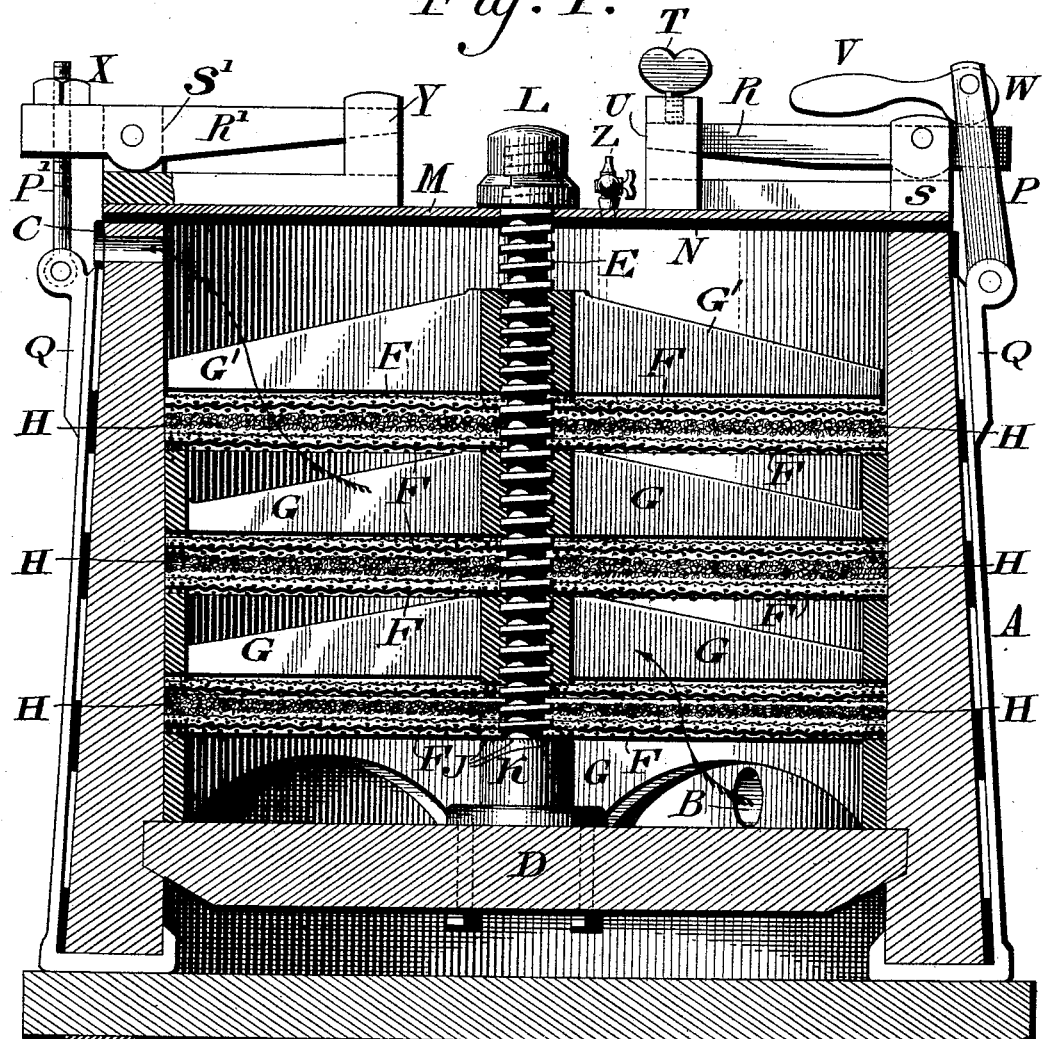
Figure 2:
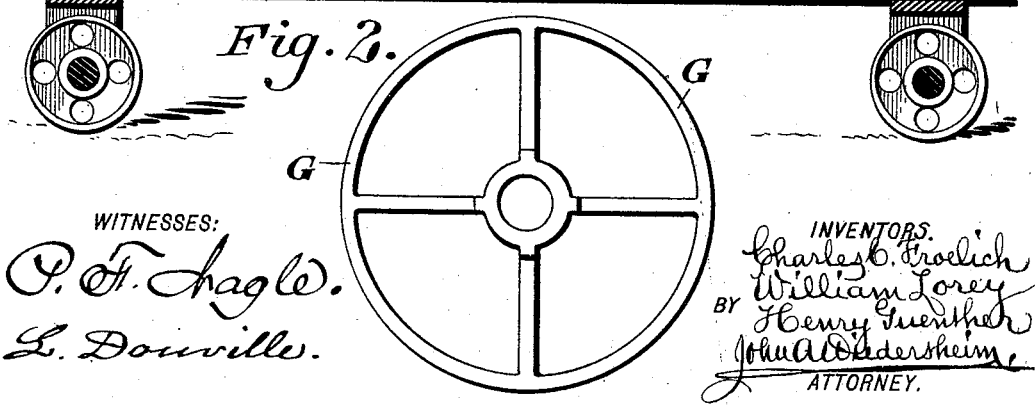

Figure 1 represents a vertical section of a filter embodying our invention. Fig. 2 represents a plan view of one of the spiders thereof.

Similar letters of reference indicate corresponding parts in the two figures.

Referring to the drawings:—A designates the tank or casing of the filter, and B and C designate the inlet and discharge ports thereof. Rising from the bottom D of the tank is a screw E, the same passing centrally through strainers or screens or perforated plates F, and diaphragms or spiders G, G', it being noticed that one of the diaphragms or spiders is rested on said bottom D, and the screens and diaphragms or spiders alternate, and that filtering material H is interposed between each pair of screens. The spiders G have screw-threaded hubs with which the screw E engages, arms radiating therefrom, and a peripheral rim. Consequently the screens are nicely supported at their centers and peripheries. The said arms are tapering or of less height than the hubs and rings, and those of the lower spider are arched or recessed on their under sides so as to allow the circulation of the water in the chamber between the perforated plates, and the rims are formed integral with said hubs and arms. The lowermost screen rests centrally on the shoulder J of the head K of the screw. Said head is screwed or otherwise firmly connected with the bottom of the tank. The top spider G' is not necessarily formed with a peripheral rim, as it is not required to sustain anything above the same, and the upper end of the screw E is provided with a nut L for tightening the lid M firmly in position on the top of the tank, it being seen that packing N is interposed between the tank and lid to form a tight joint thereat.

The operation is as follows:—Fluid is admitted into the tank, and it passes through the screens and filtering material, and so escapes in filtered condition through the port C. Owing to the spiders G, the degree of compression of the filtering material may be adjusted, due to the ability to screw said spiders up and down, such adjustment being accomplished as the parts are set up in the tank, or afterward by removing the lid and displacing screens and spiders, and duly restoring the same.

The screens F are shown as of different-sized meshes so as to effectively perform their work of straining the fluid and supporting the filtering material. The threads of the screw E are continuous so that the spiders may be placed at any place thereon.

In order to clamp the lid tightly to the tank, we employ a swinging arm P, which is pivoted or hinged to an ear Q, secured to the sides of the tank.

R designates a lever mounted on a standard S, the latter resting on the lid M, said lever being forked on its outer end so as to freely embrace said arm P. A screw T is fitted to a standard U, and adapted to bear against the inner end of the lever R, and a lever V with an eccentric head W is adapted to bear against the outer end of said lever R, it being seen that when the head W of the lever V is tightened against the lever R, the lid is compressed on its seat, and the degree of compresson may be increased or decreased or adjusted by proper operation of the screw T.

At the left hand of Fig. 1, we show a screw-threaded rod P', as a substitute for the arm P, the same passing through the lever R and mounted on a standard S', said rod P' being journaled in an ear Q' on the tank A. To the upper end of the rod is fitted a nut X, which bears against the outer end of the lever R', while the inner end of the latter enters a standard Y, and abuts upwardly against the wall therein. In this case, the compression of the lid on the tank is accomplised by the nut X, and it may be adjusted by proper operation of said nut.

The tank is provided with a cock Z for permitting the escape of air when so required.

Having thus described our invention, what we claim as new, and desire to secure by Letters Patent, is—

1. A filter consisting of a tank having a screw with a continuous thread rising from the bottom thereof, spiders with hubs adjustable on said screw, and arms with rims integral therewith, said arms having portions of reduced height, screens between said spiders, said tank having an inlet below the lowest spider, said parts being combined substantially as described.

2. A filter having a tank with screens and filtering material between the same, and diaphragms adapted to retain said screens and compress said material, in combination with a screw rising from the bottom of the tank of the filter, passing through the screens and diaphragms, and the end of the tank, and a nut which is fitted on the upper end of the screw and tightens against said lid, said parts being combined substantially as described.

CHARLES C. FROELICH.
WILLIAM LOREY.
HENRY GUENTHER.

Witnesses:
JOHN A. WIEDERSHEIM,
R. H. GRAESER.